Feb. 29, 1944.　　　T. DI STEFANO　　　2,343,046
AUTOMATIC MOTOR STARTING CHANGE-OVER DEVICE FOR USE
WITH TWO OR MORE MOTION PICTURE PROJECTORS
Filed Feb. 2, 1942　　　6 Sheets-Sheet 1

Inventor
Thomas DiStefano
By Thomas A. Jenkins
Attorney

Inventor
Thomas DiStefano
By Thomas A. Jenckes
Attorney

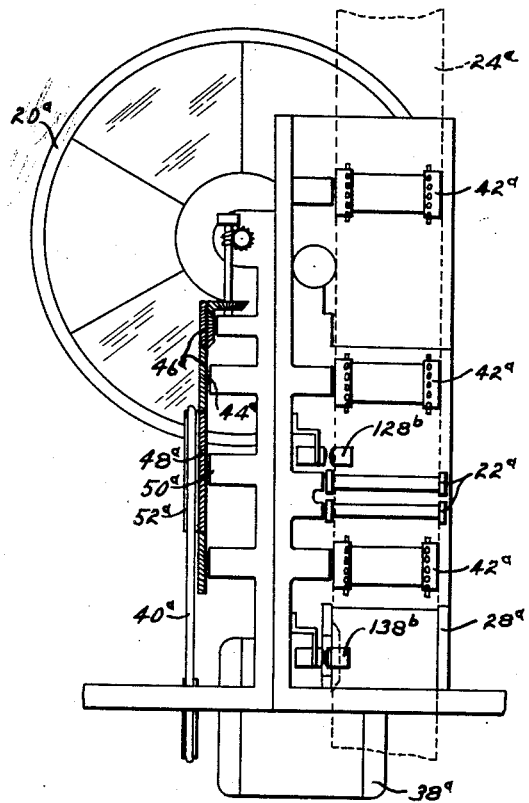
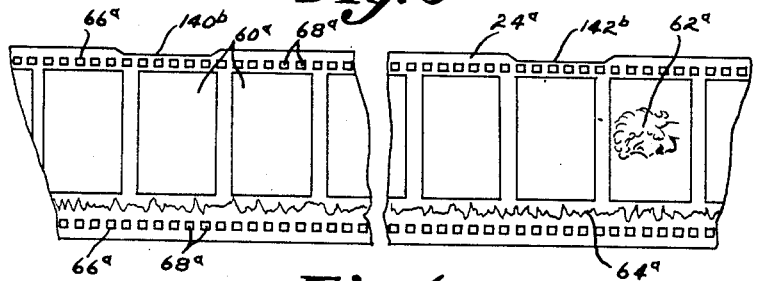

Inventor
Thomas DiStefano
By Thomas A. Jewkes
Attorney

Inventor
Thomas DiStefano
By Thomas A. Jenckes
Attorney

Patented Feb. 29, 1944

2,343,046

UNITED STATES PATENT OFFICE 2,343,046

AUTOMATIC MOTOR STARTING CHANGEOVER DEVICE FOR USE WITH TWO OR MORE MOTION-PICTURE PROJECTORS

Thomas Di Stefano, Providence, R. I.

Application February 2, 1942, Serial No. 429,166

6 Claims. (Cl. 88—17)

My invention relates to improvements in motion picture projector apparatus. Most motion pictures are so long that it is essential to employ at least two machines, and in order to insure continuity of action in the motion picture being displayed it is essential that one machine pick up the film substantially at the instant the other gives it up. At the present time, a single operator has to prepare the other machine for use while the first machine is being displayed, and then manually start up the arc light in the second machine and the motor for the second machine and at the exactly proper time operate the change-over device. As quite often happens with the human factor involved, delays often take place and the continuity of showing of the film is often interrupted. The main object of my invention, therefore, is the elimination of the human factor in the operation of changing over projector machines and their respective films at the proper moment to insure continuity of film display. I am aware that others have made various attempts to solve this problem, but so far as I am aware, there is no practical commercial device on the market for this purpose. The devices shown in prior art patents have been so complicated that their initial cost is prohibitive and their mode of operation so intricate that the usual motion picture operator cannot successfully operate them. An object of my invention, therefore, is to provide a simple relatively cheap efficient device for accomplishing the above result.

Many of the prior art patents have included means for automatically turning on the arc lamp of each machine, usually at the same time the motor is turned on just prior to the automatic operation of the changeover. These machines have been entirely unsatisfactory as it takes such a long time to positively adjust the arcs that when the changeover device has operated, the arc light for the new film is not satisfactorily adjusted. If the arcs and motor are turned on in the opposite film in time to have the arcs adjusted, the machines are left running simultaneously for a substantial period of time, with this corresponding extra cost. Realizing this difficulty, I have left the turning on and adjustment of the arc lamp to the skill of the operator, thereby enabling my improved automatic device for automatically starting the motor and actuating the changeover to take effect substantially at the completion of the run of film, and I am able to so time the turning on of the motor that it may take place a very short time before the actuation of the changeover, with a minimum amount of film being run in between such successive operations.

To operate automatic devices of this type to provide the electric contact for the desired amount of time, the film has to be designed to provide the initial electric contacts necessary to start the motor and to effect the changeover. In most prior art structures lines of conductive material have been added on the film surface, in itself a difficult operation, and particularly where the arc light is included in the automatic device, have had to be spread so far apart that a considerable extra manufacturing operation has to be performed on the film. In other prior art devices, holes have been made in the film and if anything should happen to any of the parts, the entire film inherently becomes ripped and ruined. I have so designed my device as to function with a plurality of notches formed on the edge of the film, which may be readily made even in the motion picture theater after the film has been received, and as I do not employ any device for switching the arc lights, it is apparent that the two notches necessary for the proper functioning of my invention can be placed close together near the end of the film with a minimum amount of unwinding of the film, and due to the fact that I employ notches, it is apparent that no damage to the film can take place in the event of failure of operation of any part of my device.

Another feature of my invention resides in its extreme simplicity, due to the fact that I control all parts of each unit through a single automatically operated master relay control switch having preferably four sets of contacts all simultaneously actuated by the movement of a single control member and by a single solenoid. Due to the fact that all the necessary circuits therefor converge at this single switch, it is obvious that I am able to employ a minimum number of wires of short length. In the embodiment shown I have employed a standard type of "Cutler-Hammer" four-pole magnetic switch, although other makes of magnetic switches of similar type may be employed, and I suitably merely modify the connections thereto with a minimum number of wires in a simple electrical manner to achieve similar results achieved by the complicated structures shown in the prior art. I connect a trigger circuit through the solenoid to the power lines to temporarily energize the solenoid to close the switch, and where a four-pole switch is employed, I connect the motor power lines through two of the poles, the changeover shutter circuit through another pole, and I also modify the switch by the addition of two extra wires as to connect another solenoid circuit through the same switch solenoid through the other pole of the switch to provide a circuit through the solenoid so that once the trigger circuit has functioned to temporarily energize the solenoid to close the switch, a continuous supplemental solenoid circuit will be formed to retain the switch closed until broken by the main switch. As this type of magnetic switch is of a snap action type to automatically open when the main source of power is cut off, it is obvious that it also performs the desirable function of automatically breaking all circuits when the main source of power is cut off as in changing from one machine to the other.

To further conserve wire, I preferably so connect the solenoid circuit before described in parallel with the motor circuit so as to so modify the switch that it may function as a hold down switch with the addition of a minimum number of extra wires of minimum length. It is also apparent that inasmuch as my invention only necessitates the use of a single solenoid for each projector, and danger of separate solenoids being injured or destroyed by different essential voltages in the system is obviated.

A further object of my invention is to provide a device which is entirely electrical in its action, thereby eliminating the mechanical devices formerly thought necessary in the prior art, particularly in partly mechanical and partly electrical systems.

These and such other objects of my invention as may hereinafter appear will be best understood from a description of an embodiment thereof such as is shown in the accompanying drawings.

Fig. 5 is a rear elevation of a standard type of projector head with portions of the casing removed, showing the film feeding device provided with contact switches normally separated by the film but adapted to be closed by notches formed therein in accordance with my invention.

Fig. 6 is a diagrammatic plan view of a section of a film having notches provided therein in accordance with my invention.

Figure 7:
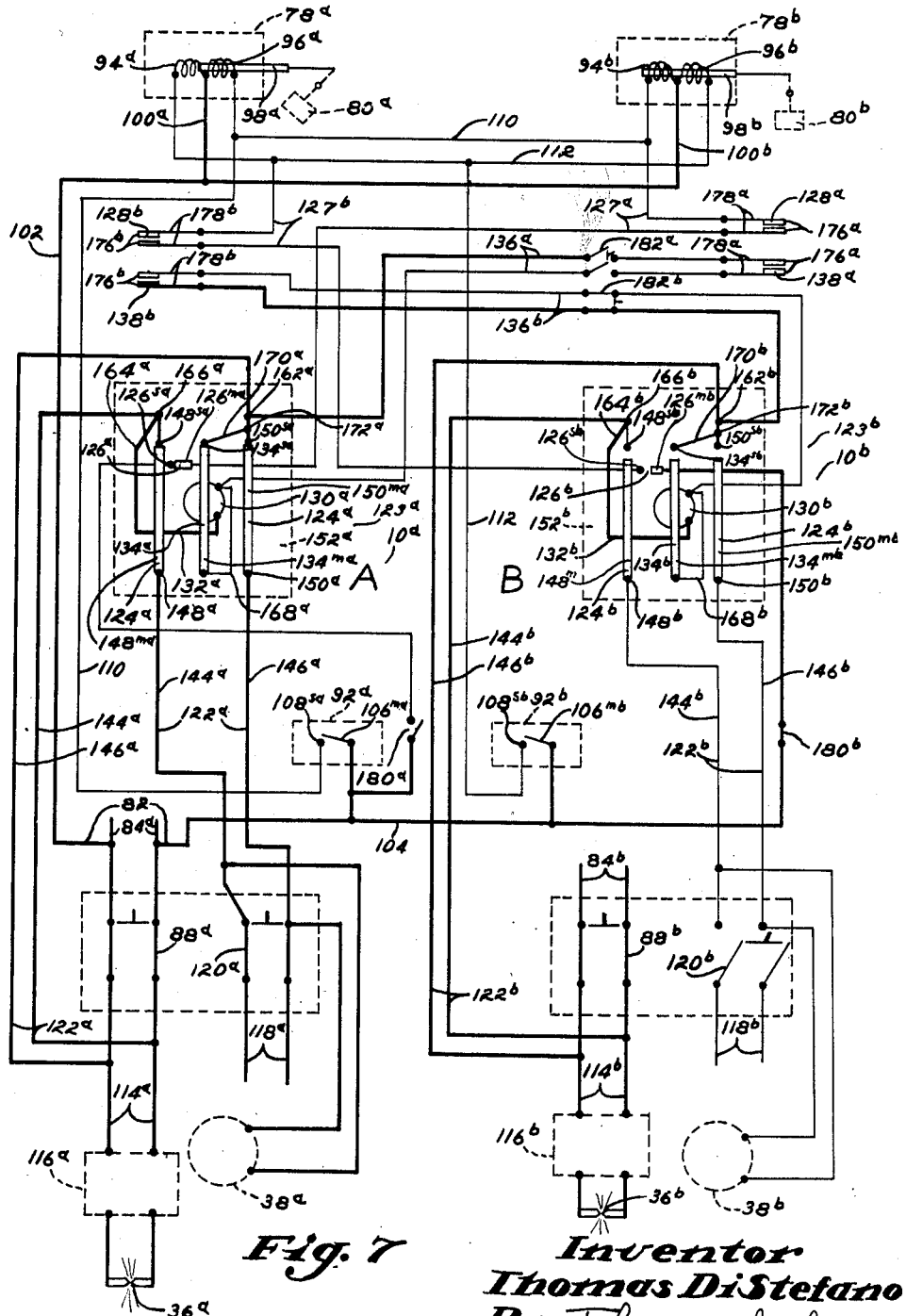

Fig. 7 is a wiring diagram of the parts of the device shown in Figs. 1-6 actually controlled by my invention and the electrical connections therefor, showing the device in normal position with one projector operating and with the main switch in the second projector circuit closed to light its respective arc lamp and connect up the circuit for actuation of the trigger circuit on closing of the trigger switch, the energized circuits being shown in heavy lines.

Figure 8:
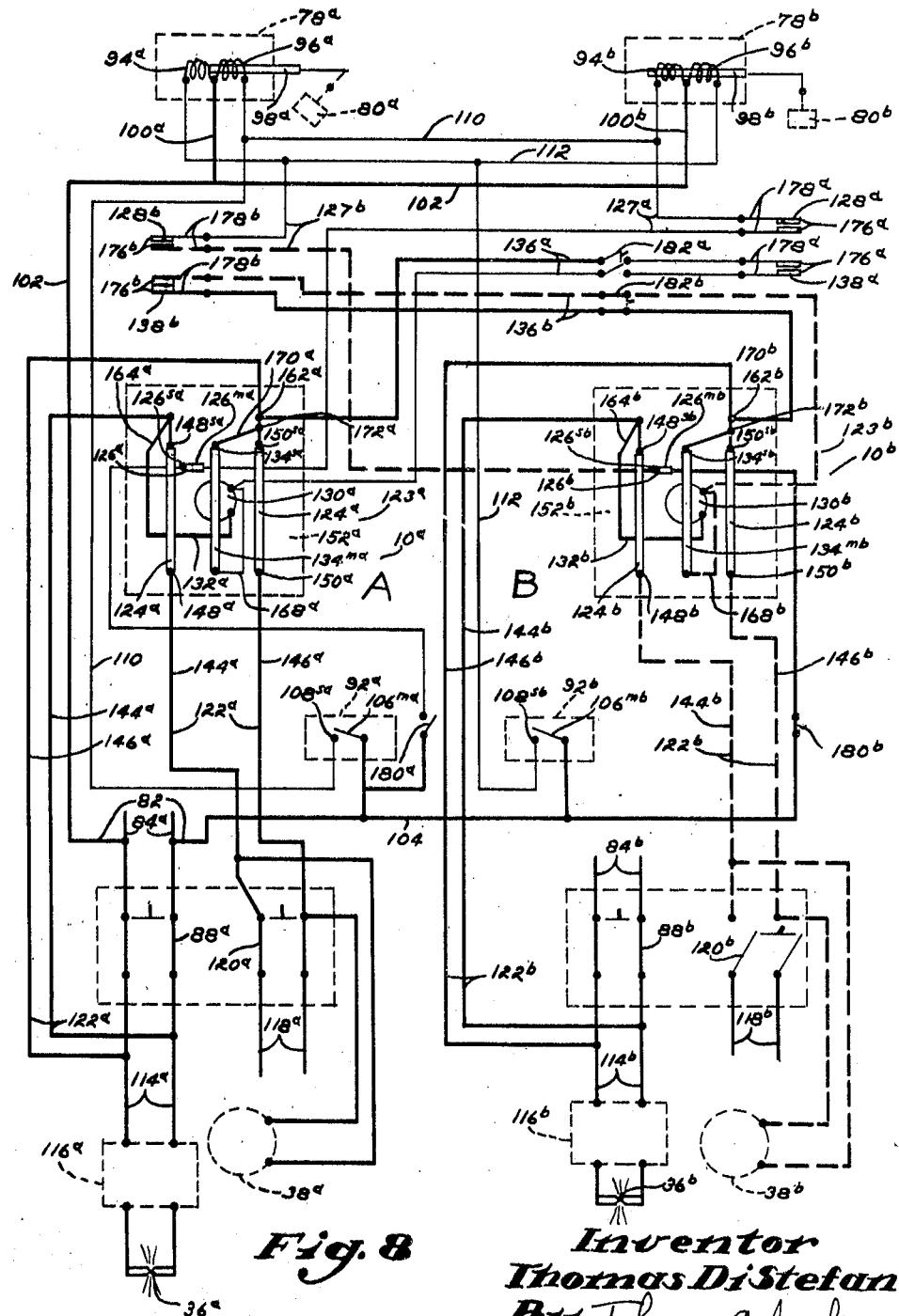

Fig. 8 is a diagrammatic view of the parts shown in Fig. 7 after the first notch in the film has functioned to actuate the trigger circuit to close the master relay control switch to connect the motor and the solenoid circuit to maintain the switch closed, and setting the device for actuation of the changeover shutters when the second notch in the film permits their respective shutter switch to be closed, the parts of my improved device not energized in Fig. 7 but energized at this stage of operation of my device being shown in heavy dotted lines.

Figure 9:
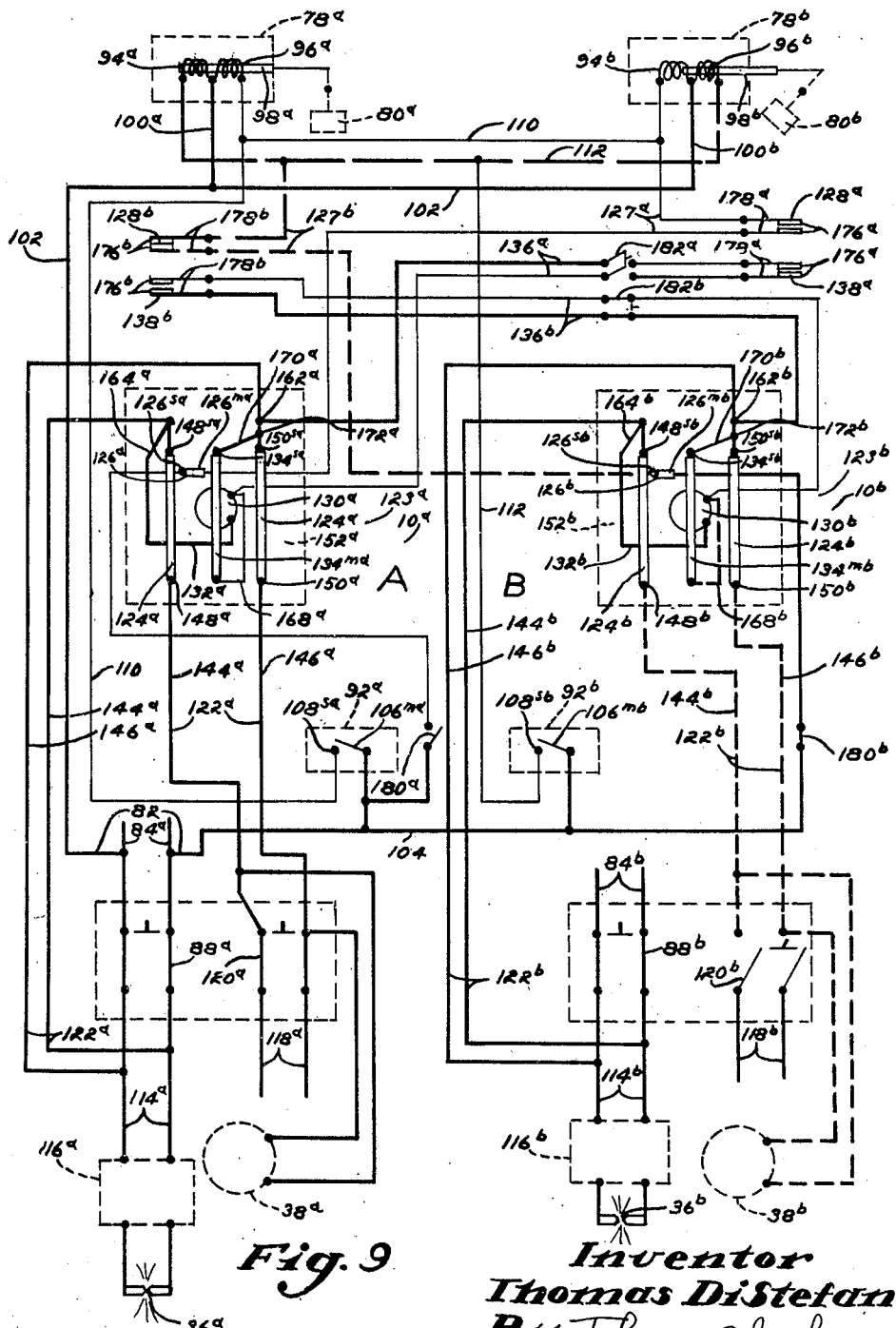

Fig. 9 is a diagrammatic view of the parts shown in Figs. 7 and 8, illustrating in dash lines the parts of the circuit energized when the second notch in the film permits closure of the switch in the shutter circuit to effect the changeover, with the other then energized circuits being shown as illustrated in Fig. 8.

In the drawings, wherein like characters of reference generaly indicate like parts throughout, 10$^a$ and 10$^b$ generally indicate a motion picture projector apparatus constructed in accordance with my invention. Said apparatus includes the two projector machines 10$^a$ and 10$^b$ of standard type suitably connected together to operate successively to project a continuous run of the motion picture on the screen. Each respective projector apparatus comprises the usual frame 12$^a$ or 12$^b$ having the usual standard 14$^a$ or 14$^b$ mounted on the front portion thereof on which the projector head 16$^a$ or 16$^b$ is mounted, said projector head having the usual extension 18$^a$ or 18$^b$ projecting forwardly therefrom containing the lens (not shown). The usual suitably rotated projector shutter 20$^a$ or 20$^b$ is mounted in front or rear of each lens extension 18$^a$ or 18$^b$. The rear surface of the projector head 16$^a$ or 16$^b$ is provided with the usual guide rolls 22$^a$ or 22$^b$ for guiding the film 24$^a$ or 24$^b$ pulled downwardly from the film letoff magazine 26$^a$ or 26$^b$ along the guideway 28$^a$ or 28$^b$ (Fig. 5), over the rear surface of the sound head 30$^a$ or 30$^b$ and into the film takeup magazine 32$^a$ or 32$^b$. The lamp house 34$^a$ or 34$^b$ containing the arc lamp 36$^a$ or 36$^b$ is located in rear of the projector head 16$^a$ or 16$^b$ to concentrate the light through the film 24$^a$ or 24$^b$ and out through the lens onto the screen. The film is suitably drawn from the letoff magazine 26$^a$ or 26$^b$ into the takeup magazine 32$^a$ or 32$^b$ by the film sprockets 42$^a$ or 42$^b$, suitably mounted on shafts 44$^a$ or 44$^b$ driven by suitable intermeshing gears 46$^a$ or 46$^b$, driven by a suitable drive gear 48$^a$ or 48$^b$ on a stub shaft 50$^a$ or 50$^b$ having a pulley 52$^a$ or 52$^b$ on the outer end thereof driven by the belt 40$^a$ or 40$^b$ driven by the motor 38$^a$ or 38$^b$. Similar drive sprockets are located on the sound head, the lowermost one of which is mounted on a shaft having a drive pulley 54$^a$ or 54$^b$ thereon, which by medium of the belt 56$^a$ or 56$^b$ drives the film takeup roll 58$^a$ or 58$^b$ in the film takeup magazine 32$^a$ or 32$^b$. The film 24$^a$ or 24$^b$ (Fig. 6) is provided with the usual frames 60$^a$ or 60$^b$ having the positive picture impressions 62$^a$ or 62$^b$ thereon and the sound track 64$^a$ or 64$^b$. The film is also provided adjacent each edge thereof with the usual rows 66$^a$ or 66$^b$ of aligned sprocket holes 68$^a$ or 68$^b$ for receiving the ends of the sprockets for driving purposes. As usual, the inverted image of each picture impression 62$^a$ or 62$^b$ is projected through the lens onto the film successively from each frame 60$^a$ or 60$^b$ so as to provide a continuity of motion picture action on the screen, and simultaneously the sound track 64$^a$ or 64$^b$ actuates the sound mechanism in synchronism therewith. The frame 12$^a$ or 12$^b$ of each projector apparatus 10$^a$ or 10$^b$ has the usual main switch box 70$^a$ or 70$^b$ having a main arc switch handle 72$^a$ or 72$^b$ projecting therefrom and a motor switch handle 74$^a$ or 74$^b$ also projecting therefrom and the rectifier box 76$^a$ or 76$^b$ containing a suitable standard type of rectifier.

I have shown the projectors 10$^a$ and 10$^b$ provided with a standard type of changeover mechanism which may be bought on the market. This comprises the solenoid casings 78$^a$ and 78$^b$, each having the respective changeover shutter 80$^a$ or 80$^b$ projecting therefrom to be respectively raised and lowered to a position cutting off a respective light beam from one projector 10$^a$ or 10$^b$ through the film and projector head. In accordance with the present practice, said changeover shutters are actuated by a suitable shutter circuit 82 connected to the source of supply 84ª for the machine A, comprising the usual line wires 84ª. The source of supply 84ª or 84ᵇ of each projector A or B has the main double pole hand switch 88ª or 88ᵇ therein and the changeover circuit 82 branching off from the main line 84ª is connected to each respective solenoid box 78ª and 78ᵇ. Said solenoid circuit is usually controlled by the foot switches 92ª and 92ᵇ, which on the respective depression thereof actuate the respective solenoids 94ª or 94ᵇ and 96ª or 96ᵇ to respectively raise or lower each respective changeover shutter 80ª or 80ᵇ. I have diagrammatically illustrated in Figs. 7-9 the structure of each solenoid box 78ª or 78ᵇ and its respective shutter 80ª or 80ᵇ. Each solenoid box 78ª or 78ᵇ contains the respective solenoids 94ª and 96ª or 94ᵇ and 96ᵇ arranged in alignment with each other and containing the solenoid rod or core 98ª or 98ᵇ. The two respective solenoids 94ª and 96ª or 94ᵇ and 96ᵇ are connected by the common wire 100ª or 100ᵇ to one line 102 of the solenoid circuit 82. Each solenoid shutter 80ª or 80ᵇ is operatively connected to the end of the movable solenoid core 98ª or 98ᵇ to be respectively raised or lowered as the respective solenoid 94ª or 96ª or 94ᵇ or 96ᵇ is respectively actuated. Each solenoid 94ª or 94ᵇ is adapted to move its solenoid core 98ª or 98ᵇ into a position moving the shutter 80ª or 80ᵇ to a position intercepting its respective beam of light. Each respective solenoid 96ª or 96ᵇ is adapted to move its solenoid core 98ª or 98ᵇ to move its shutter to a position away from its respective beam of light. The respective solenoids 94ª and 96ᵇ are connected to function simultaneously to respectively move the shutter 80ᵇ to an open position, freeing its respective beam of light, and to move the shutter 80ª to a closed position, intercepting its respective beam of light. Conversely, as shown in Fig. 7, are the solenoids 96ª and 94ᵇ connected to move their respective shutters, 80ª to a position freeing its respective beam of light and 80ᵇ to a position cutting off its respective beam of light. The switch 92ª is connected into the circuit 82, adapted on the depression thereof to close the circuit to actuate the respective solenoids 96ª and 94ᵇ to open the shutter 80ª and close the shutter 80ᵇ, and the switch 92ᵇ is connected into the circuit 82 to respectively actuate the solenoids 94ª and 96ᵇ to close the shutter 80ª and open the shutter 80ᵇ. Each respective switch 92ª and 92ᵇ is provided with the movable contact 106ᵐᵃ or 106ᵐᵇ and the stationary contact 108ˢᵃ or 108ˢᵇ. The respective movable contacts 106ᵐᵃ and 106ᵐᵇ are connected to the opposite main line 84ª by the wire 104 of the changeover circuit 82. The stationary contact 108ˢᵃ of the switch 92ª is connected by the wire 110 to the solenoid 96ª and the solenoid 94ᵇ. The stationary contact 108ˢᵇ of the switch 92ᵇ is connected by the wire 112 to the solenoid 94ª and the solenoid 96ᵇ. Each main circuit 84ª or 84ᵇ is also provided with the arc light circuit 114ª or 114ᵇ passing through the rectifier 116ª or 116ᵇ and connected to the terminals of the arc light 36ª or 36ᵇ. Each motor 38ª or 38ᵇ is provided with the usual motor circuit 118ª or 118ᵇ having the usual double pole hand switch 120ª or 120ᵇ interposed therein.

Broadly speaking, my invention includes the addition of supplemental circuits for each machine to the circuits just described, comprising a supplemental trigger circuit having a contact switch therein adapted to be actuated by a notch near the end of the run of the film in one projector to actuate a solenoid to close a plurality of switches which simultaneously (a) energize the supplemental motor circuit to start the motor in the opposite projector; (b) complete a solenoid circuit to maintain the switches closed; and (c) set a supplemental changeover circuit having a contact therein for later actuation. I also provide a second notch in said film, preferably spaced only a slight distance from said first notch to immediately thereafter function to actuate the changeover circuit hitherto described to changeover the respective shutters 80ª and 80ᵇ. I thus supplementally attach the changeover device heretofore described and known as a separate attachment in the prior art as part of my improved combination, and I also electrically connect up my improved device by means of a supplemental trigger circuit, a supplemental motor circuit and a supplemental solenoid circuit for each machine so that the respective motor of the opposite projector will be turned on slightly before the functioning of the changeover apparatus near the end of the opposite film, so that the motor of said opposite projector will automatically be turned on and the changeover automatically actuated independently of any act by the operator. My invention, therefore, broadly includes a motion picture projector apparatus comprising the two projector machines 10ª and 10ᵇ, a source of electric current 84ª and 84ᵇ for each respective machine, a changeover device comprising a projection shutter 80ª and 80ᵇ for each respective machine, electrically actuated means to positively open each shutter and electrically actuated means to positively close each shutter, namely the respective solenoids 94ª and 96ª and 94ᵇ and 96ᵇ heretofore described, a supplemental motor circuit 122ª or 122ᵇ connecting each source of supply 84ª or 84ᵇ to its respective motor 38ª or 38ᵇ having a solenoid actuated switch 124ª or 124ᵇ therein preferably comprising a double pole switch, a shutter circuit 82 including the shutter circuit hitherto described, having a new supplemental branch 127ª or 127ᵇ for each machine connecting the power line 104 to the respective lines 110 and 112 for actuating the respective changeover solenoids in the manner hitherto described, each having a solenoid actuated switch 126a or 126ᵇ therein and a contact switch 128ª or 128ᵇ therein, a multi switch actuating solenoid 130ª or 130ᵇ for each machine, a supplemental solenoid circuit 132ª or 132ᵇ connecting each solenoid 130ª or 130ᵇ in parallel with each line of each motor supplemental circuit 122ª or 122ᵇ in front of each double pole switch 124ª or 124ᵇ also having a solenoid actuated single pole switch 134ª or 134ᵇ therein and a trigger circuit 136ª or 136ᵇ connecting each solenoid 130ª or 130ᵇ to each supplemental motor circuit 122ª or 122ᵇ having a trigger contact switch 138ª or 138ᵇ therein normally retained in broken position by the opposite film 24ᵇ or 24ª, whereby one notch 140ª or 140ᵇ adjacent the end of the opposite film 24ᵇ or 24ª may actuate said trigger contact switch 138ª or 138ᵇ to actuate said solenoid 130ª or 130ᵇ to close all said solenoid actuated switches 124ª or 124ᵇ, 134ª or 134ᵇ and 126ª or 126ᵇ in said aforementioned respective circuits so that said solenoid circuit 132ª or 132ᵇ may then continue to actuate said solenoid 130ª or 130ᵇ to maintain said switches closed and simultaneously start its respective motor and a second notch 142ª or 142ᵇ in said opposite film 24ᵇ or 24ª near the end thereof may actuate the contact switch 128ª or 128ᵇ in said supplemental shutter branch circuit 127$^a$ or 127$^b$ to actuate its respective shutter actuating means to open its respective shutter and actuate the opposite shutter actuating means to close the shutter on the other machine.

Figure 1:
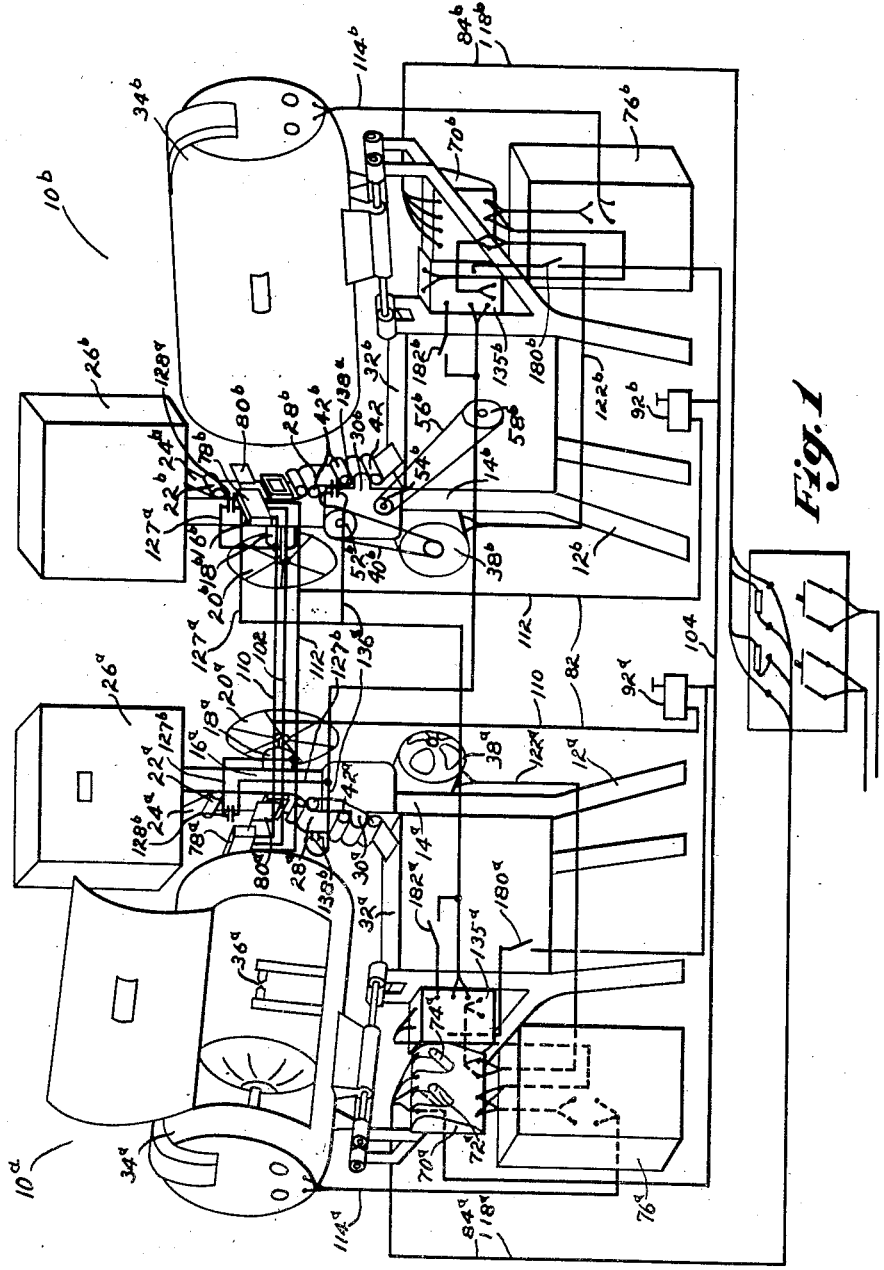
Fig. 1 is a diagrammatic perspective view illustrating two projector machines connected together in accordance with my invention.
Figure 2:
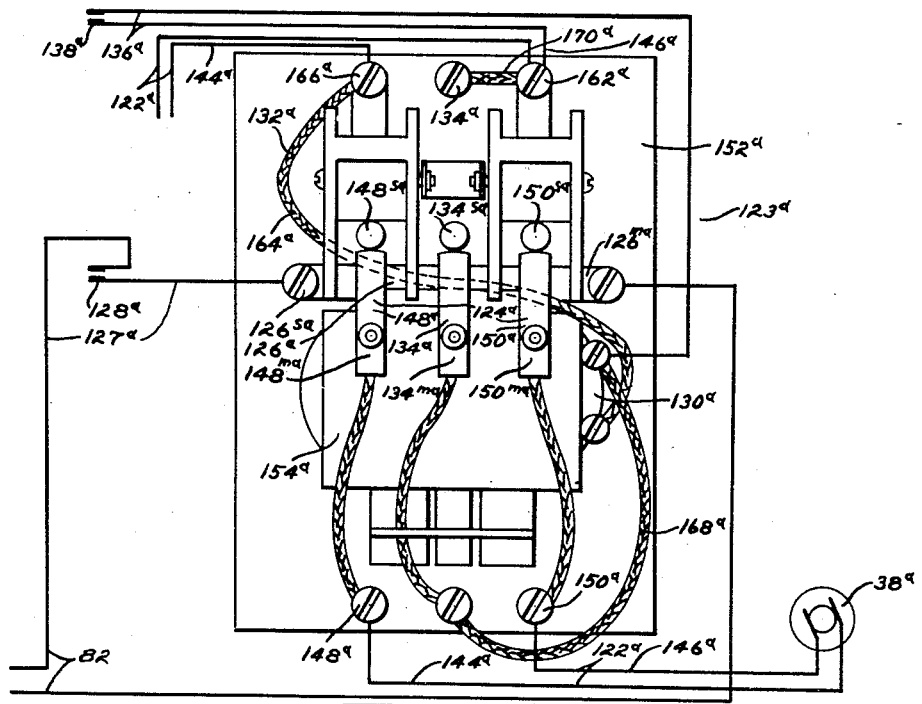
Fig. 2 is a plan view of the master magnetic switch I preferably employ connected up to function in accordance with my invention, portions of other parts of my invention being shown diagrammatically.
Figures 3, 4:
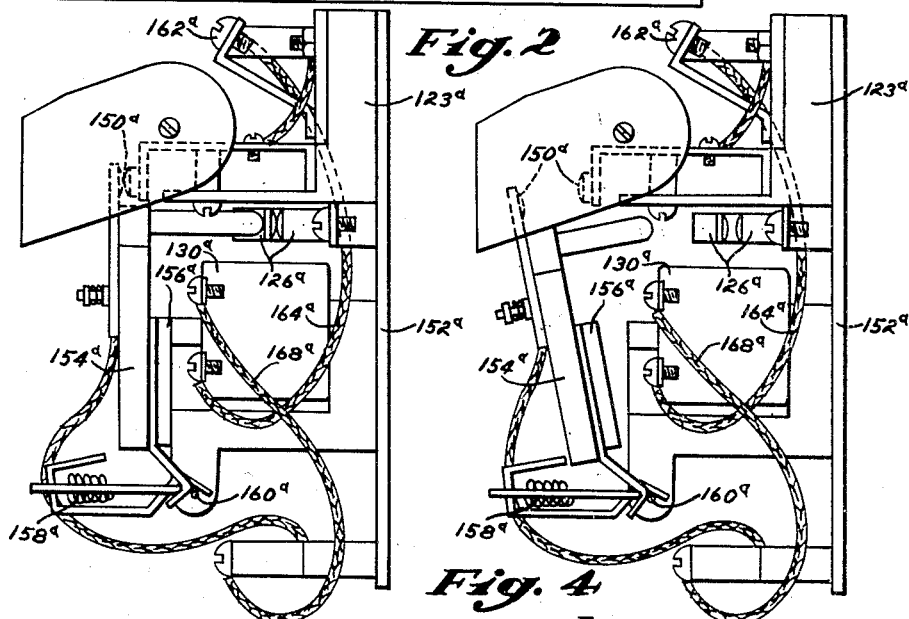
Fig. 3 is a side elevation of the master switch shown in Fig. 2 in closed actuating position.
Fig. 4 is a side elevation similar to Fig. 3 of the switch shown in Fig. 2 in open position.

While any suitable type of solenoid means may be provided for closing the respective switches 124$^a$ or 124$^b$, 126$^a$ or 126$^b$ and 134$^a$ or 134$^b$ simultaneously and retaining them in a closed position until the main switch 88$^a$ or 88$^b$ is broken, I preferably for this purpose modify a standard type of magnetic switch 123$^a$ or 123$^b$ now on the market. As shown in Figs. 2–4, for the A machine I have employed for this purpose a four pole switch. The supplemental motor circuit 122$^a$ or 122$^b$ comprises the lines 144$^a$ or 144$^b$ and 146$^a$ or 146$^b$ which are connected respectively to the main circuit 84$^a$ or 84$^b$. In order to positively prevent arcing in the switch, the motor switch 124$^a$ or 124$^b$ in each supplemental motor circuit 122$^a$ or 122$^b$ preferably comprises the two poles 148$^a$ or 148$^b$ and 150$^a$ or 150$^b$. As shown in Figs. 2, 3 and 4 the stationary contacts 126$^{sa}$ or 126$^{sb}$, 134$^{sa}$ or 134$^{sb}$, 148$^{sa}$ or 148$^{sb}$ and 150$^{sa}$ or 150$^{sb}$ are mounted on the common base 152, and the respective movable contacts 126$^{ma}$ or 126$^{mb}$, 134$^{ma}$ or 134$^{mb}$, 148$^{ma}$ or 148$^{mb}$ and 150$^{ma}$ or 150$^{mb}$ are suitably mounted on a lever 154$^a$ or 154$^b$ pivotally mounted at 160$^a$ or 160$^b$ on the base 152$^a$ or 152$^b$ in any suitable manner, said movable contacts being rigidly mounted on the lower surface of said lever 154$^a$ or 154$^b$ to positively abut their respective stationary contacts when the lever 154$^a$ or 154$^b$ is urged downwardly by its respective solenoid 130$^a$ or 130$^b$. For this purpose, in the embodiment of switch shown, a portion 156$^a$ or 156$^b$ of the solenoid core is mounted on the lever 154$^a$ or 154$^b$ to be pulled downwardly by the energized solenoid 130$^a$ or 130$^b$. In order that the switch may function with less electrical energy, the lever 154$^a$ or 154$^b$ may be counter-balanced by the spring 158$^a$ or 158$^b$, which spring 158$^a$ or 158$^b$ also functions to retain the lever 154$^a$ or 154$^b$ on its pivot 160$^a$ or 160$^b$, which structure also provides a readily detachable construction. The stationary contact 148$^{sa}$ or 148$^{sb}$ and the movable contact 148$^{ma}$ or 148$^{mb}$ are interposed in the line 144$^a$ or 144$^b$ of the supplemental motor circuit 122$^a$ or 122$^b$ and the stationary contact 150$^{sa}$ or 150$^{sb}$ and the movable contact 150$^{ma}$ or 150$^{mb}$ are interposed in the line 146$^a$ or 146$^b$ of the supplemental motor circuit 122$^a$ or 122$^b$. One end of the trigger circuit 136$^a$ or 136$^b$ is connected to the line 146$^a$ or 146$^b$ of the supplemental motor circuit 122$^a$ or 122$^b$ at the point 162$^a$ or 162$^b$ in front of the contact switch 150$^a$ or 150$^b$, and the other end of the trigger circuit 136$^a$ or 136$^b$ is connected to one end of the solenoid coil 130$^a$ or 130$^b$. As stated hitherto, I take a standard type of four-pole magnetic switch now on the market. While such types of four-pole magnetic switches are made by various manufacturers, I have illustrated a standard type made by the Cutler-Hammer Company, and I have modified said four-pole switch to include a solenoid circuit connected in parallel across the respective lines 144$^a$ or 144$^b$ and 146$^a$ or 146$^b$ of the supplemental motor circuit 122$^a$ or 122$^b$. For this purpose I provide the wire 164$^a$ or 164$^b$ connected to the line 144$^a$ or 144$^b$ of the supplemental motor circuit 122$^a$ or 122$^b$ at the point 166$^a$ or 166$^b$ in front of switch 148$^a$ or 148$^b$, and I connect the opposite end of said wire 164$^a$ or 164$^b$ to the opposite end of the solenoid 130$^a$ or 130$^b$. It is thus apparent that when the switch 138$^a$ or 138$^b$ abutting the film 24$^b$ or 24$^a$ opposite projector B or A is closed, the solenoid 130$^a$ or 130$^b$ will be temporarily energized to pull the switch lever 154$^a$ or 154$^b$ temporarily to a closed position closing all said respective switches 126$^a$ or 126$^b$, 134$^a$ or 134$^b$, 148$^a$ or 148$^b$ and 150$^a$ or 150$^b$. In order that the solenoid 130$^a$ or 130$^b$ when thus temporarily energized may stay energized, I provide the supplemental solenoid circuit 132$^a$ or 132$^b$ hitherto explained, which includes said line 164$^a$ or 164$^b$ connected to one line 144$^a$ or 144$^b$ of the supplemental motor circuit 122$^a$ or 122$^b$, and suitable lines 168$^a$ or 168$^b$ and 170$^a$ or 170$^b$ connecting the switch 134$^a$ or 134$^b$ to the opposite line 146$^a$ or 146$^b$ of the supplemental motor circuit. These comprise the wire 168$^a$ or 168$^b$ connected to the opposite end of the solenoid 130$^a$ or 130$^b$ from the wire 164$^a$ or 164$^b$ and to the movable contact 134$^{ma}$ or 134$^{mb}$ and the wire 170$^a$ or 170$^b$ connecting the stationary contact 134$^{sa}$ or 134$^{sb}$ to the line 146$^a$ or 146$^b$ at the point 172$^a$ or 172$^b$. It is thus obvious that when the switch lever 154$^a$ or 154$^b$ has been pulled down by the temporary energizing of the solenoid 130$^a$ or 130$^b$ to close all said switches 126$^a$ or 126$^b$, 134$^a$ or 134$^b$, 148$^a$ or 148$^b$ and 150$^a$ or 150$^b$, current will then flow through the wire 170$^a$ or 170$^b$, closed switch 134$^a$ or 134$^b$, wire 168$^a$ or 168$^b$, solenoid 130$^a$ or 130$^b$ and wire 164$^a$ or 164$^b$ in parallel across the wires 144$^a$ or 144$^b$ and 146$^a$ or 146$^b$ of the supplemental motor circuit 122$^a$ or 122$^b$ to maintain the solenoid 130$^a$ or 130$^b$ in energized condition, maintaining said respective switches closed until the main switch 88$^a$ or 88$^b$ is broken. Each composite magnetic switch 123$^a$ or 123$^b$ hitherto described is preferably mounted in the supplemental switch box 135$^a$ or 135$^b$, shown in Fig. 1, in a vertical plane so that when the current is broken in the main line by the opening of the switch 88$^a$ or 88$^b$, the lever 154$^a$ or 154$^b$ will pivot by gravity to an open position. Instead, however, of mounting the base 152$^a$ or 152$^b$ of said switch in a vertical plane, it is obvious that suitable spring means may be provided to throw the switch to open position.

The respective contact switches 128$^a$ or 128$^b$ and 138$^a$ or 138$^b$ in the respective trigger and changeover circuits 136$^a$ or 136$^b$ and 127$^a$ or 127$^b$ preferably comprise button contacts 176$^a$ or 176$^b$ mounted on resilient arms 178$^a$ or 178$^b$ normally urging them to closed position, but normally separated in the manner explained by the film 24$^a$ or 24$^b$ until they are respectively released by the respective notches 140$^a$ or 140$^b$ and 142$^a$ or 142$^b$. As explained, while I preferably employ a four-pole switch including a separate switch 148$^a$ or 148$^b$ and 150$^a$ or 150$^b$ for each respective line 144$^a$ or 144$^b$ and 146$^a$ or 146$^b$ of each supplemental motor circuit to prevent arcing in the switch, it is apparent, if desired, that one of the switches 148$^a$ or 148$^b$ or 150$^a$ or 150$^b$ in the respective lines 144$^a$ or 144$^b$, or 146$^a$ or 146$^b$ may be omitted. Each respective shutter circuit 127$^a$ or 127$^b$ is also preferably provided with the hand switches 180$^a$ or 180$^b$ and each respective trigger circuit 136$^a$ or 136$^b$ is also preferably provided with the hand switch 182$^a$ or 182$^b$. The respective hand switches 180$^a$ or 180$^b$ and 182$^a$ or 182$^b$ may be employed to cut out the respective trigger circuit and supplemental shutter circuit if it be desired to run a straight run of film through the machine without having my invention function. They also may be employed, if desired, as safety features while running the early part of a film through my machine to prevent the actuation of the trigger circuit or shutter circuit with their consequent result on the presence of any unknown notch or tear in the film, and may, if desired, be only closed as the notches approach. These circuits may also be broken, if desired, while the operator is cleaning or otherwise working upon a respective machine when not in use.

I have illustrated diagrammatically in the electric diagrams shown in Figs. 7, 8 and 9 successive steps in the functioning of my invention. Fig. 7 illustrates machine A in operation and machine B about to start up. The main switch 88a in the A machine is closed and the motor switch 120a is also closed. The main switch 88b of the B circuit is also closed, causing the arc light 36b to light so that the arcs for the machine B about to start up may be thoroughly adjusted in advance of the successive actuation of the trigger and changeover circuits in the manner to be described. The shutter 80a in the A machine is open and the shutter 80b in the B machine is closed. While the lever 154a carrying the contact switches 126a, 134a, 148a and 150a of the magnetic switch is open, breaking the contacts in the respective supplemental motor circuit 122a, trigger circuit 136a and solenoid circuit 132a, current blackflows from the main line 84a along the lines 144a and 146a of the supplemental circuit 122a to the stationary contacts 148sa and 150sa and to the contact 134sa through the wire 170a, and simultaneously current flows through the wire 164a to the base of the solenoid 130a but does not pass through the solenoid. The switches 180a and 182a are open, thus permitting current to flow in the solenoid and trigger circuits to them but not any further in the circuits. Current also flows along the trigger circuit line 102 to the respective central common wires 100a and 100b of the respective shutter solenoids. In machine B the main switch 88b has just been closed, lighting the arc lamp 36b and causing a flow of current up to the stationary terminals 150sb and 148sb and through the wire 170b to the stationary contact 134sb and through the wire 164b to the lower end of the solenoid 130b. Current also flows from the main line 84a in the shutter circuit 82 out to the movable contact 126mb. Current also flows through the trigger circuit 136b up to the stationary contact of the switch 138b. The respective switches 180b and 182b are closed so that the respective film control contact switches 138b and 128b may close in the manner to be described. At this stage, the run of the filfim is almost complete in the A machine and the respective notch 140b in the film 24a approaches the contact 138b and the device is ready so that when said notch 140b passes through the contact switch 138b in the trigger circuit 136b a temporary contact will be made by the unrestrained automatic closure of the switch 138b to temporarily energize the solenoid circuit 132b.

Fig. 8 illustrates the contacts and circuits at the instant the switch 138b becomes closed. As is then apparent, as shown in dotted lines, current will then be passed through the other terminal of the trigger circuit 136b to the solenoid 130b, temporarily energizing the lever 154b and causing all the respective contact switches 126b, 134b, 148b and 150b to close. Due to the closure of the contact switches 148b and 150b, the wires 144b and 146b of the supplemental motor line will be energized, as shown in dotted lines, causing operation of the motor 38b. The solenoid circuit 132b will be continuously energized to retain the lever 154b in closed position, maintaining said respective contact switches 126b, 134b, 148b and 150b closed. Inasmuch as the switch 126b is closed, the changeover circuit will be energized from the switch 126b up to the changeover contact switch 128b, in which at this instant its stationary contact is still separated from its movable contact by the film as the respective notch 142b approaches.

Fig. 9 diagrammatically illustrates just what happens the instant the notch 142b passes through the switch 128b to cause actuation of the changeover device. As shown, current now passes through the closed switch 128b to the line 112 actuating the solenoid 94a to move the shutter 89a to a position damming the flow of light from the A machine and simultaneously actuating the solenoid 96b to raise the shutter 80b out of the way of the path of light to project the film on the screen from the machine B. This only takes a very short while, and the time interval permitted by the notch 142b is sufficient for the temporary actuation of the respective solenoids 94a and 96b for this purpose. I have illustrated in dash lines how the current temporarily passes through the switch 128b to the line 112, which, as stated, energizes the respective solenoids 94a and 96b to actuate the changeover shutters 80a and 80b in the manner described. Inasmuch as at this instant the switch 138b is again closed by the film, it is obvious that current no longer passes through the trigger circuit from the contact switch 138b to the solenoid 130b.

I have illustrated usual foot switches 92a and 92b for the changeover circuits which may be selectively employed as usual by the operator if he so desires. It is first necessary to close the switch 120a in order to initially energize the circuits in the manner explained to initially start the motor 38a and so that the changeover device will operate as previously explained. After the initial changeover, the hand motor switches 120a and 120b may be left open until the run of the film is complete, each motor 38a or 38b successively operating from its supplemental motor line 122a or 122b. After each successive changeover, such as from the machine A to the machine B, or vice versa, the respective main switch 88a or 88b is opened to permit the pivoted lever 154a or 154b of the magnetic switch to pivot to open position, positively breaking contact in the respective contact switches 126a or 126b, 134a or 134b, 148a or 148b and 150a or 150b so that they may be be automatically closed by the respective trigger circuits 136a or 136b when the respective notch 140a or 140b again passes between the contacts thereof.

It is thus apparent that I have provided a novel type of automatic motor starting changeover device for use with two or more motion picture projectors with the advantages explained above.

It is understood that my invention is not limited to the specific embodiment shown and that various deviations may be made therefrom without departing from the spirit and scope of the appended claims.

What I claim is:

1. Motion picture projector apparatus comprising two machines, a source of electric current for each machine, a motor for each machine, a changeover device comprising a projection shutter for each machine, electrically actuated means to positively open each shutter and electrically actuated means to positively close each shutter; a circuit connecting each respective motor to its source of electric current having a solenoid actuated switch therein, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film and a solenoid actuated switch therein, multi switch actuating solenoid means for each machine, a solenoid circuit connecting each solenoid means in parallel with the lines of its motor circuit also having a solenoid actuated switch therein and a trigger circuit connecting each solenoid means to its respective motor circuit having a trigger contact switch therein normally retained in broken condition by the opposite film whereby one notch adjacent the end of the film in one machine may actuate in the opposite machine its trigger contact switch to actuate its trigger circuit to actuate its solenoid means to close its solenoid means actuated switches in its aforementioned circuits so that its solenoid circuit may then continue to actuate its solenoid means to maintain its switches closed to energize the shutter circuit branch for the opposite machine up to its contact switch and simultaneously start its respective motor and a second notch near the end of the film in said first machine may actuate the contact switch in its shutter circuit branch for said opposite machine to actuate the shutter opening means for its respective shutter and actuate the shutter closing means for the shutter on the first machine.

2. Motion picture projector apparatus comprising two machines, a source of electric current having a main switch therein for each machine, a motor for each machine, a changeover device comprising a projection shutter for each machine, electrically actuated means to positively open each shutter and electrically actuated means to positively close each shutter; a circuit connecting each respective motor to its source of electric current having a solenoid actuated switch therein, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film and a solenoid actuated switch therein, multi switch actuating solenoid means for each machine, a solenoid circuit connecting each solenoid means in parallel with the lines of its motor circuit also having a solenoid actuated switch therein and a trigger circuit connecting each solenoid means to its respective motor circuit having a trigger contact switch therein normally retained in broken condition by the opposite film whereby one notch adjacent the end of the film in one machine may actuate in the opposite machine its trigger contact switch to actuate its trigger circuit to actuate its solenoid means to close its solenoid means actuated switches in its aforementioned circuits so that its solenoid circuit may then continue to actuate its solenoid means to maintain its switches closed to energize the shutter circuit branch for the opposite machine up to its contact switch and simultaneously start its respective motor and a second notch near the end of the film in said first machine may actuate the contact switch in its shutter circuit branch for said opposite machine to actuate the shutter opening means for its respective shutter and actuate the shutter closing means for the shutter on the first machine, said solenoid actuated switches being adapted to move to broken condition on opening said main switch breaking said supply of electric current.

3. Motion picture projector apparatus comprising two machines, a source of current for each machine, a motor for each machine, a changeover device comprising a projection shutter for each machine, electrically actuated means to positively open each shutter and electrically actuated means to positively close each shutter; a circuit connecting each respective motor to its source of electric current, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film, a multi switch actuating solenoid for each machine, a solenoid circuit connecting each solenoid to its respective source of electric current, a solenoid actuated multi contact switch for each machine comprising said solenoid, four stationary contacts and a switch blade carrying four cooperating movable contacts normally biased to an open position, actuated to a closed position completing its circuits on actuation of said solenoid, two of said cooperating sets of contacts being connected in the lines of its motor circuit, another of said sets of contacts being connected in its shutter circuit branch and the other of said sets of contacts being connected in its solenoid circuit and a trigger circuit connecting each solenoid to its respective source of electric current having a trigger contact switch therein normally retained in broken condition by the opposite film whereby one notch adjacent the end of the film in one machine may actuate in the opposite machine its trigger contact switch to actuate its trigger circuit to actuate its solenoid to close its solenoid actuated multi contact switch so that its solenoid circuit may then continue to actuate its solenoid to maintain its multi contact switch closed and simultaneously start its respective motor and a second notch in the film in said first machine near the end thereof may actuate in said opposite machine the contact switch in its shutter circuit branch to actuate its shutter opening means for its respective shutter and actuate the shutter closing means for the shutter on the first machine.

4. Motion picture projector apparatus comprising two machines, a source of current for each machine, a motor for each machine, a changeover device comprising a projection shutter for each machine, electrically actuated means to positively open each shutter and electrically actuated means to positively close each shutter; a circuit connecting each respective motor to its source of electric current, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film, a multi switch actuating solenoid for each machine, a solenoid circuit connecting each solenoid in parallel with its motor circuit, a solenoid actuated multi contact switch for each machine comprising said solenoid, four stationary contacts and a switch blade carrying four cooperating movable contacts normally biased to an open position, actuated to a closed position completing its circuits on actuation of said solenoid, two of said cooperating sets of contacts being connected in the lines of its motor circuit, another of said sets of contacts being connected in its shutter circuit branch and the other of said sets of contacts being connected in its solenoid circuit and a trigger circuit connecting each solenoid to its motor circuit having a trigger contact switch therein normally retained in broken condition by the opposite film whereby one notch adjacent the end of the film in one machine may actuate in the opposite machine its trigger contact switch to actuate its trigger circuit to actuate its solenoid to close its solenoid actuated multi contact switch so that its solenoid circuit may then continue to actuate its solenoid to maintain its multi contact switch closed and simultaneously start its respective motor and a second notch in the film in said first machine near the end thereof may actuate in said opposite machine the contact switch in its shutter circuit branch to actuate its shutter opening means for its respective shutter and actuate the shutter closing means for the shutter on the first machine.

5. Motion picture projector apparatus comprising two machines, a source of current for each machine, a motor for each machine, a changeover device comprising a projection shutter for each machine, electrically actuated means to positively open each shutter and electrically actuated means to positively close each shutter; a circuit connecting each respective motor to its source of electric current, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film, a multi switch actuating solenoid for each machine, a solenoid actuated multi contact switch for each machine comprising said solenoid, four stationary contacts and a switch blade carrying four cooperating movable contacts normally biased to an open position actuated to a closed position completing its circuits on actuation of said solenoid, two of said cooperating sets of contacts being connected in the lines of its motor circuit, another of said sets of contacts being connected in its shutter circuit branch, a wire connecting one end of the solenoid to its respective source of electric current, a supplemental wire connecting the other movable contact to its solenoid and another supplemental wire connecting the other stationary contact to its source of electric current forming a supplemental solenoid circuit and a trigger circuit connecting each solenoid to its respective source of electric current having a trigger contact switch therein normally retained in broken condition by the opposite film whereby one notch adjacent the end of the film in one machine may actuate in the opposite machine its trigger contact switch to actuate its trigger circuit to actuate its solenoid to close its solenoid actuated multi contact switch so that its solenoid circuit may then continue to actuate its solenoid to maintain its multi contact switch closed and simultaneously start its respective motor and a second notch in the film in said first machine near the end thereof may actuate in said opposite machine the contact switch in its shutter circuit branch to actuate its shutter opening means for its respective shutter and actuate the shutter closing means for the shutter on the first machine.

6. Motion picture projector apparatus comprising two machines, a source of current for each machine, a motor for each machine, a changeover device comprising a projection shutter for each machine, electrically actuated means to positively open each shutter and electrically actuated means to positively close each shutter; a circuit connecting each respective motor to its source of electric current, a shutter circuit connecting a source of electric current to the means for opening each respective shutter and the means for closing each opposite shutter having a branch for each machine connected to the opening means for its shutter and the closing means for the shutter on the opposite machine, having a contact switch therein normally retained in broken condition by the opposite film, a multi switch actuating solenoid for each machine, a solenoid actuated multi contact switch for each machine comprising said solenoid, four stationary contacts and a switch blade carrying four cooperating movable contacts normally biased to an open position actuated to a closed position completing its circuits on actuation of said solenoid, two of said cooperating sets of contacts being connected in the lines of its motor circuit, another of said sets of contacts being connected in its shutter circuit branch, a wire connecting one end of its solenoid to a line of its motor circuit, a supplemental wire connecting the other movable contact to its solenoid and another supplemental wire connecting the other stationary contact to the opposite line of its motor circuit forming a supplemental solenoid circuit connected in parallel with said motor circuit and a trigger circuit connecting each solenoid to its motor circuit having a trigger contact switch therein normally retained in broken condition by the opposite film whereby one notch adjacent the end of the film in one machine may actuate in the opposite machine its trigger contact switch to actuate its trigger circuit to actuate its solenoid to close its solenoid actuated multi contact switch so that its solenoid circuit may then continue to actuate its solenoid to maintain its multi contact switch closed and simultaneously start its respective motor and a second notch in the film in said first machine near the end thereof may actuate in said opposite machine the contact switch in its shutter circuit branch to actuate its shutter opening means for its respective shutter and actuate the shutter closing means for the shutter on the first machine.

THOMAS DI STEFANO.